United States Patent
Furuya et al.

(10) Patent No.: US 12,489,739 B2
(45) Date of Patent: *Dec. 2, 2025

(54) AUTHENTICATION SYSTEM, AUTHENTICATION SERVER, AND SENSOR

(71) Applicant: Asahi Kasei Microdevices Corporation, Tokyo (JP)

(72) Inventors: Takaaki Furuya, Tokyo (JP); Keiichiro Kuwata, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 198 days.

This patent is subject to a terminal disclaimer.

(21) Appl. No.: 18/177,141

(22) Filed: Mar. 2, 2023

(65) Prior Publication Data

US 2023/0308428 A1 Sep. 28, 2023

(30) Foreign Application Priority Data

Mar. 23, 2022 (JP) ................. 2022-047446
Jan. 13, 2023 (JP) ................. 2023-004157

(51) Int. Cl.
*H04L 9/40* (2022.01)
*H04L 67/12* (2022.01)

(52) U.S. Cl.
CPC .............. *H04L 63/08* (2013.01); *H04L 67/12* (2013.01)

(58) Field of Classification Search
CPC ................................ H04L 67/12; H04L 63/08
See application file for complete search history.

(56) References Cited

U.S. PATENT DOCUMENTS

| | | | |
|---|---|---|---|
| 7,827,006 B2 | 11/2010 | Miller | |
| 10,743,819 B2 | 8/2020 | Bandyopadhyay | |
| 12,166,893 B2 | 12/2024 | Wakabayashi | |
| 2007/0084937 A1 | 4/2007 | Ahmed | |
| 2012/0105199 A1 | 5/2012 | Sanders | |

(Continued)

FOREIGN PATENT DOCUMENTS

| | | |
|---|---|---|
| CN | 210952926 U | 7/2020 |
| JP | 2008304124 A | 12/2008 |

(Continued)

OTHER PUBLICATIONS

The "3 dense appearance solution" in Asahi Chemical Industry is adopted by Toho University (Jan. 13, 2022), Internet URL: https://prtimes.jp/main/html/rd/p/000000031.000079452.html (search on Jul. 21, 2022) p. 1,2.

(Continued)

*Primary Examiner* — Benjamin A Kaplan (57) ABSTRACT

An authentication system includes: a sensor including an instrumentation unit configured to instrument environment information about an environment in a space to be authenticated, a generating unit configured to generate statistical information about the environment of the space based on the environment information, and a communication unit configured to transmit the statistical information to an authentication server configured to authenticate the space based on the statistical information; and the authentication server. The authentication server includes an authentication unit configured to authenticate the space based on the statistical information.

20 Claims, 8 Drawing Sheets

(56) References Cited

U.S. PATENT DOCUMENTS

| | | |
|---|---|---|
| 2012/0150755 A1 | 6/2012 | Kumar |
| 2013/0232255 A1 | 9/2013 | Fukui |
| 2015/0281219 A1 | 10/2015 | Kostiainen |
| 2019/0186951 A1 | 6/2019 | Edwards |
| 2020/0081134 A1 | 3/2020 | Wheeler |
| 2020/0348038 A1 | 11/2020 | Risbeck |
| 2021/0183406 A1 | 6/2021 | Rogers |
| 2021/0214163 A1 | 7/2021 | Deacon |
| 2023/0253119 A1 | 8/2023 | Corso |
| 2023/0304430 A1 | 9/2023 | Kempema |
| 2023/0368906 A1* | 11/2023 | Huang ................ G16H 15/00 |
| 2024/0149171 A1* | 5/2024 | Paddock ............ G06F 21/6254 |

FOREIGN PATENT DOCUMENTS

| | | |
|---|---|---|
| JP | 2009230237 A | 10/2009 |
| JP | 2011038718 A | 2/2011 |
| JP | 2011069601 A | 4/2011 |
| JP | 2019061633 A | 4/2019 |
| JP | 2019220869 A | 12/2019 |
| JP | 2020013346 A | 1/2020 |
| JP | 2021023492 A | 2/2021 |
| JP | 7209121 B1 | 1/2023 |

OTHER PUBLICATIONS

Space visualisation solution AIRsual of which office space can be considered to be safe, safety, and comfort, (online) Jun. 20, 2021, Internet URL:https://web.archive.org/web/20210620065628/https://solution.murata.com/ja-jp/service/airsual/ (search on Jul. 21, 2022), p. 2.

High Precision $CO_2$ Sensor Jul. with temperature and humidity sensor; eAir, (online) Jul. 30, 2021, internet URL: https://web.archive.org/web/20210730102512/https:/linkjapan.co.jp/product/eair/ (search on Jul. 21, 2022) p. 9.

* cited by examiner

AUTHENTICATION SYSTEM, AUTHENTICATION SERVER, AND SENSOR

The contents of the following Japanese patent application(s) are incorporated herein by reference:
NO. 2022-047446 filed in JP on Mar. 23, 2022
NO. 2023-004157 filed in JP on Jan. 13, 2023

BACKGROUND

1. Technical Field

The present invention relates to an authentication system, an authentication server, and a sensor.

2. Related Art

Patent Document 1 discloses a carbon dioxide sensor capable of wireless communication.

PRIOR ART DOCUMENT

Patent Document

Patent Document 1: Japanese Patent Application Publication No. 2008-304124

DESCRIPTION OF EXEMPLARY EMBODIMENTS

Hereinafter, an embodiment of the present invention will be described. The embodiment does not limit the invention according to the claims. In addition, not all combinations of features described in the embodiment are essential to the solution of the invention.

Figure 1:
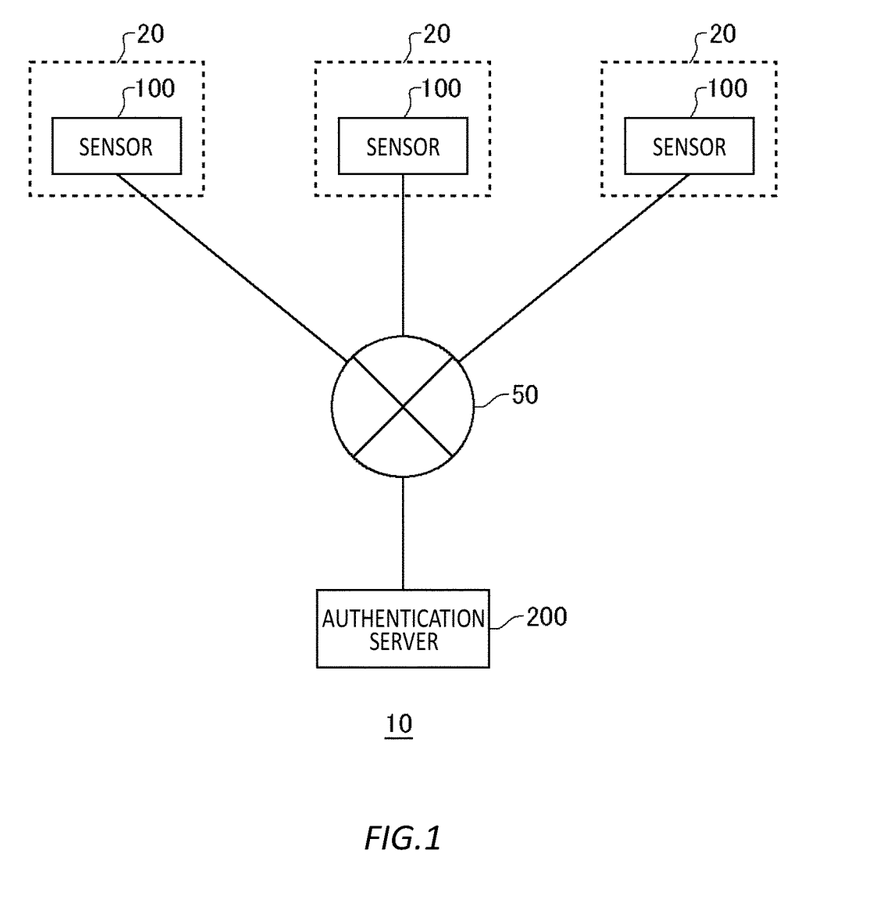
FIG. 1 is a diagram representing an example of a system configuration of an authentication system.

FIG. 1 is a diagram representing an example of a system configuration of an authentication system 10 according to the present embodiment. The authentication system 10 includes a plurality of sensors 100 and an authentication server 200. The authentication system 10 may include an environment control apparatus configured to change an environment condition. The environment control apparatus may include at least one of ventilation equipment or air conditioning equipment such as an air conditioner, an air purifier, a dehumidifier, a circulator, heating equipment, and a humidifier. The sensor 100 and the authentication server 200 may be each a computer having a CPU and a memory, and may be each configured to perform various functions by the CPU performing various programs stored in the memory. The sensor 100 and the authentication server 200 are configured to communicate with each other via a network 50.

The plurality of sensors 100 may be provided at different positions in one space 20 to be authenticated. The space 20 may be, for example, an interior of a construction, such as a store or a building, or an interior of a transportation apparatus such as a car, a ship, a railroad vehicle, or an airplane. In addition, the space 20 may be a plurality of different rooms, constructions, or locations. The sensor 100 is configured to instrument environment information about an environment in the space 20. The authentication server 200 is configured to authenticate the space 20 based on the environment information. The authentication server 200 is managed by an administrator of an institution such as a government office with jurisdiction over authentication of the space 20. The environment information may represent at least one of a gas concentration, a dust level, temperature, humidity, a noise, an illuminance, vibration, an electromagnetic wave, an X-ray dose, a radiation dose, an airflow velocity, or an ozone concentration to be instrumented in the space 20. The sensor 100 may have a battery, and may be configured to be driven by electrical power from the battery. Thereby, even when there is no power supply facility for supplying power to the sensor 100 in the space 20, the sensor 100 can be driven. By driving the sensor 100 with the battery, the sensor can be installed in and moved to an arbitrary place. Here, authentication of the space 20 means guaranteeing that the space 20 satisfies a predetermined criterion. The authentication server 200 authenticates the space 20, for example, when a moving average value of a concentration of carbon dioxide in the space 20 for a specific period, for example, 1 hour, is always equal to or less than a specific concentration, for example, 1000 ppm or less.

In addition, in authentication of a plant factory or the like, the authentication server 200 may authenticate that the moving average value of the concentration of carbon dioxide in the space 20 for a specific period, for example, 1 hour, is always between specific concentrations, for example, between 700 ppm and 1000 ppm.

Here, authentication of the space 20 means measuring a space with a sensor having a traceability from a reference instrumentation, and guaranteeing that the space is in a certain environment state. In addition, authentication of the space 20 means measuring a space with a plurality of independent sensors 100 and guaranteeing that the space is in a certain environment state.

When the sensor 100 is a gas sensor, the sensor may be configured to instrument a gas concentration of gas to be instrumented, according to a non-dispersive infrared absorption method, a photoacoustic method, a solid electrolyte method, a thermal conduction method, an acoustic wave method, or a capacitance method. The gas to be instrumented may be carbon dioxide, a volatile organic compound (VOC), or oxygen. The gas to be instrumented may be a combustible gas such as methane, propane, or ethanol. The gas to be instrumented may be a toxic gas such as carbon monoxide, hydrogen sulfide, or formaldehyde. The sensor 100 may be a dust sensor, a temperature/humidity sensor, a noise sensor, an illuminance sensor, a vibration sensor, an electromagnetic wave measuring instrument, an X-ray measuring instrument, a radiation measuring instrument, or an airflow tester, etc.

When authenticating the space 20 based on the environment information of the space 20, it is considered that an inspector visits the space 20 such as a store, uses a portable gas sensor to instrument the environment information to be instrumented, and checks whether the instrumented environment information satisfies a predetermined condition for authentication. However, when there are a large number of spaces 20 to be authenticated, or when the space 20 to be authenticated is present in a remote location, there is a case where authentication by the inspector cannot be performed efficiently. Therefore, a system is desired that is capable of efficiently performing authentication of the space 20 while suppressing a processing burden of the sensor 100.

The sensor 100 is fixed at a predetermined position in the space 20. The sensor 100 is fixed with a bolt or the like so that it cannot be easily detached from the predetermined position in the space 20. The sensor 100 has a tamper-resistant function, and is configured to detect that the sensor has been detached, when the sensor has been detached from the predetermined position.

Figure 2:
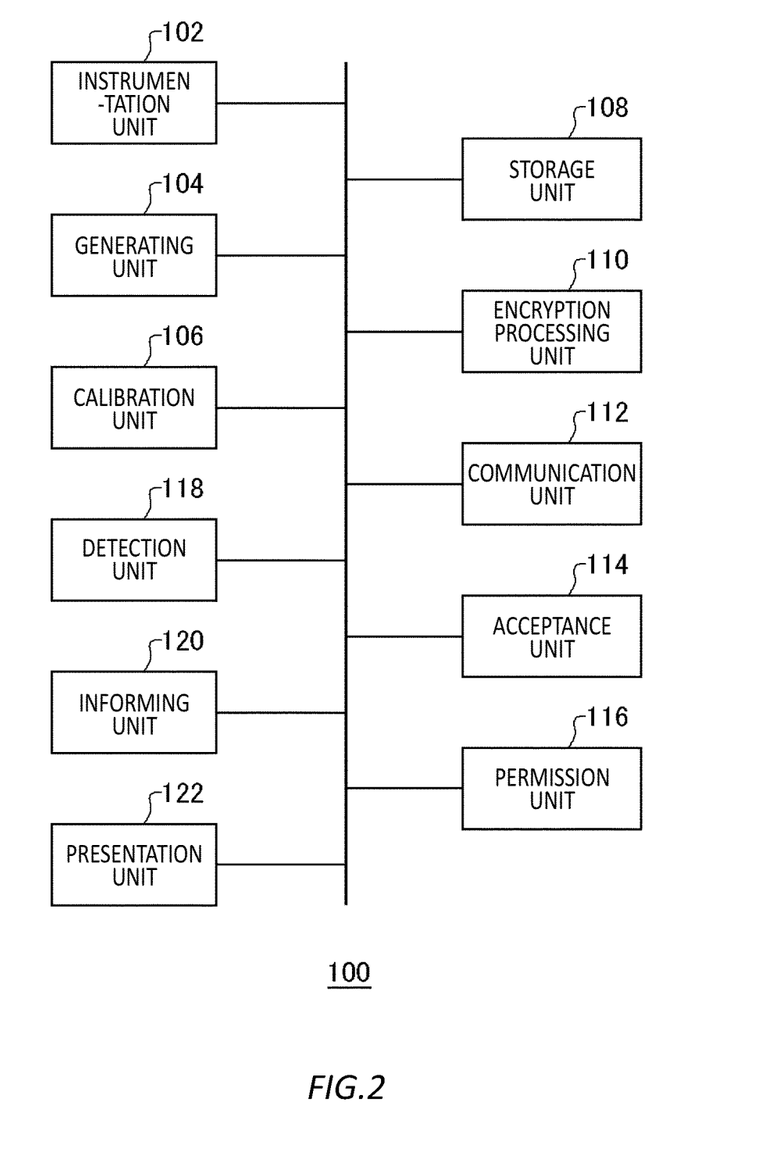
FIG. 2 is a diagram representing an example of a functional block of a sensor.

FIG. 2 shows an example of a functional block of the sensor 100. The sensor 100 includes an instrumentation unit 102, a generating unit 104, a calibration unit 106, a storage unit 108, an encryption processing unit 110, a communication unit 112, an acceptance unit 114, a permission unit 116, a detection unit 118, an informing unit 120, and a presentation unit 122.

The instrumentation unit 102 is configured to instrument environment information about an environment in the space 20 to be authenticated. The instrumentation unit 102 is configured to instrument environment information about an environment in the space 20 to be authenticated at predetermined intervals, for example, at intervals of once or more every 60 seconds. The instrumentation unit 102 may include a light emitting unit configured to emit an infrared ray and a light receiving unit configured to receive the infrared ray having transmitted through a gas to be instrumented, and may be configured to instrument a gas concentration of the gas by using an infrared absorption characteristic of the gas to be instrumented. The instrumentation unit 102 may be configured to instrument gas information representing a concentration of gas in the space 20, as the environment information. The instrumentation unit 102 may be configured to instrument carbon dioxide information representing a concentration of carbon dioxide in the space 20, as the gas information. In addition to the gas information, the instrumentation unit 102 may be configured to further instrument temperature/humidity information representing temperature and humidity in the space 20, as the environment information.

In addition, the instrumentation unit 102 may be configured to detect whether a measurement value of the instrumented environment information is an abnormal value. The instrumentation unit 102 may be configured to determine that a measurement value x is an abnormal value when an abnormality degree α(x) at the measurement value x, which is defined by the following equation (1) where an average value and a standard deviation in past measurement value data for a certain time are respectively denoted as μ and σ, is equal to or greater than a predetermined threshold.

(Expression 1)

$$\alpha(x) = \frac{(x-\mu)^2}{\sigma^2} \quad (1)$$

In addition, the instrumentation unit 102 may be configured to set, as an abnormality degree β, the smallest distance, or one of the top distances when arranged in ascending order, among distances of the past measurement value data for a certain time and the measurement value x, and compare the same with a threshold, thereby determining that the measurement value x is an abnormal value. Here, the distance is a distance in a mathematical sense including an absolute difference or a Mahalanobis distance, etc.

The generating unit 104 is configured to generate statistical information about the environment of the space, based on the environment information. The generating unit 104 is configured to generate statistical information of the environment information instrumented by the instrumentation unit 102 continuously over a predetermined period. The generating unit 104 is configured to generate statistical information including, for example, an average value, a minimum value, and a maximum value of a gas concentration in a predetermined period. The generating unit 104 is configured to cause the statistical information to be stored in the storage unit 108. The generating unit 104 may be configured to generate statistical information including at least one of an average value, a maximum value, a minimum value, a variance, a moment, or a histogram of a gas concentration in a predetermined period. The statistical information may include an abnormal value of the environment information and a frequency of the abnormal value. The generating unit 104 may be configured to generate the statistical information by using a machine learning model.

The communication unit 112 includes a wireless communication interface and is configured to transmit the statistical information to the authentication server 200 in a wireless manner. The communication unit 112 may also be configured to transmit the statistical information to the authentication server 200 in a wired manner. The encryption processing unit 110 is configured to encrypt information that is transmitted by the communication unit 112. The communication unit 112 is configured to receive an authentication result of the space 20 based on a statistical result by the authentication server 200. The communication unit 112 may include a transmission unit and a reception unit. The reception unit configured to receive the authentication result may also be provided in a terminal other than the sensor 100, such as a smart phone.

The storage unit 108 is configured to store sensor identification information for uniquely identifying the sensor 100. The sensor identification information may be a serial number of the sensor 100. The sensor identification information may represent at least one of an apparatus ID, a date of manufacture of an apparatus, a product model number, manufacturer/seller and their contact points, a manufacturing location, a warranty period, an operating principle of an apparatus, an apparatus specification, a recommended operating environment (temperature, humidity), a name of an apparatus, a manufacturing lot number, a safety standard that an apparatus meets, a disposal method, an applicable standard for a specific substance (JIS, JEDEC, etc.), a record relating to self-calibration (time, calibration data used, adjustment parameters before and after calibration), an identification number on a network, an installer name (store name, etc.), an installer contact point (telephone number, e-mail address, website URL, etc.), an installation location address, an installation date and time, or a record relating to a consent from a user to the effect that the environment information may be transmitted to an outside. The storage unit 108 may be configured to store the statistical information in association with the sensor identification information.

The communication unit 112 may be configured to transmit the sensor identification information to the authentication server 200 together with the statistical information. The authentication server 200 may be configured to associate the statistical information and the sensor identification information and register them in a storage unit such as a database accessible by the authentication server 200. The communication unit 112 may be configured to transmit an installer name, an installer contact point (telephone number, e-mail address, website URL), an installation location address, and an installation date and time, as well as an apparatus ID of the sensor 100 to the authentication server 200, in response to an instruction from the user. The authentication server 200 may be configured to associate installer information about an installer, including the installer name, installer contact point (telephone number, e-mail address, website URL), installation location address, and installation date and time, as well as the apparatus ID of the sensor 100, and register them in a database on a network accessible by the authentication server 200. A casing of the sensor 100 may be provided with link information such as a bar code, a two-dimensional code, or RFID representing information enabling access to a website for associating the installer information and the apparatus ID. For example, by reading the link information with a camera mounted on a portable terminal such as a smart phone, the portable terminal accesses the website. Then, when the user inputs the installer information and the apparatus ID via the portable terminal, the installer information and the apparatus ID may be associated and registered in the database.

A level of access authority to the environment information stored in the storage unit 108 may be higher than a level of access authority to the statistical information stored in the storage unit 108. The environment information is detailed raw data about the space 20, and has a higher level of confidentiality than that of the statistical information. Therefore, from a standpoint of privacy protection, access to the environment information stored in the storage unit 108 is preferably restricted to only a specific user such as an administrator of the space 20. The generating unit 104 may be configured to delete the environment information stored in the storage unit 108, in response to generating the statistical information.

The detection unit 118 is configured to detect whether the sensor 100 is installed at a predetermined position. The detection unit 118 has a tamper-resistant function, and, for example, when the detection unit detects that the screw fixing the sensor 100 is detached, the detection unit updates the installation information stored in the storage unit 108 and representing whether the sensor 100 is installed at a predetermined position. That is, when the sensor 100 is detached, the detection unit 118 updates the installation information into installation information representing that the sensor 100 is not installed at a predetermined position. The installation information may be flag information representing whether the sensor 100 is installed at a predetermined position, i.e., bit information representing "0" or "1". The detection unit 118 may be configured to monitor a voltage of a pin connected to the casing of the sensor 100 by the tamper-resistant function, and when the voltage exceeds a threshold, the detection unit may set the flag by updating the bit information from "0" to "1", for example. The voltage of the pin fluctuates and exceeds the threshold when the casing is opened, for example.

The detection unit 118 may include a position information acquisition function of acquiring position information representing a current position where the sensor 100 is present. The detection unit 118 may include a GNSS receiver, such as a Global Positioning System (GPS) receiver, a Global Navigation Satellite System (GLONASS) receiver, or a BeiDou Navigation Satellite System (BDS) receiver, as the position information acquisition function. The detection unit 118 may be configured to determine that the sensor 100 has been detached, and to update the installation information, when the current position of the sensor 100 is different from a position predetermined as an installation position. The communication unit 112 may be configured to transmit the installation information to the authentication server 200 together with the statistical information. Alternatively, the position of the sensor 100 or space 20 may be specified using the position information obtained from the positional information acquisition function, or the position of the sensor 100 or space 20 may be stored in the storage unit 108.

The communication unit 112 may be configured to transmit failure information representing whether the sensor 100 has failed to the authentication server 200 together with the statistical information.

The calibration unit 106 is configured to perform calibration of the sensor 100. A characteristic of the sensor 100 may change along with the lapse of time. The characteristic of the sensor 100 refers to a characteristic of an optical element or the like, for example, when the sensor 100 is an optical element and is also a $CO_2$ (carbon dioxide) sensor according to the non-dispersive infrared absorption method in which a gas concentration is measured by infrared light. The characteristic of an optical element or the like may change over time. For this reason, the sensor 100 is configured to perform calibration for correcting instrumentation accuracy.

The calibration unit 106 may be configured to perform calibration based on a gas concentration calculated by itself and a predetermined reference gas concentration in the space 20 to be instrumented. The calibration unit 106 may be configured to correct a coefficient for calculating the gas concentration so that the gas concentration calculated by itself matches the reference gas concentration when a condition under which the gas concentration in the space 20 becomes the reference gas concentration is satisfied. The sensor 100 may be configured to correct the coefficient so that a minimum value of the gas concentration calculated by itself within a predetermined period matches the reference gas concentration. The condition under which the gas concentration in the space 20 becomes the reference gas concentration is, for example, a condition that a time point at which the calibration unit 106 performs calibration is a time zone in which a possibility of presence of a living body such as a human is low. The condition under which the gas concentration in the space 20 becomes the reference gas concentration is, for example, a condition that a time point at which the calibration unit 106 performs calibration is within a predetermined period after predetermined ventilation of the space 20 is performed for a predetermined period or longer.

The storage unit 108 may be configured to store calibration information including at least one of a calibration time at which calibration should be performed by the calibration unit 106, a date and time of calibration performed by the calibration unit 106, a calibration method, or calibrator information. The calibration method is a method of calibration that is performed by the calibration unit 106. The calibration method may represent, for example, a ventilation time of the space 20, a ventilation method such as a ventilation setting of a ventilation apparatus, a time from ventilation to calibration execution, and the like. The calibration method may represent, for example, that calibration is performed within a predetermined time zone after ventilation of a predetermined ventilation time is performed in a specific time zone at night when no person is present. The communication unit 112 may be configured to transmit the calibration information to the authentication server 200 together with the statistical information. The calibration method may represent at least one of a type of gas to be instrumented, a concentration, a concentration score, a traceability system, a concentration accuracy, a gas component, a gas purchase date/calibration certificate issue date, a gas seller, a gas purchaser, a container symbol number, an expiration date of gas, a type of an adjustment parameter (for example, zero, span, offset, sensitivity), environment information at the time of calibration (temperature, humidity, atmospheric pressure, and date and time), or a residual pressure of calibration gas.

The informing unit 120 may be configured to inform an outside of a message representing the calibration time stored in the storage unit 108. The informing unit 120 may be configured to display a message representing the calibration time on a display unit of the sensor 100. The informing unit 120 may be configured to transmit a message representing the calibration time to the administrator of the space 20 via the communication unit 112 by an e-mail or the like. The informing unit 120 may be configured to deliver a message representing the calibration time to the administrator of the space 20 in writing.

If a fraud action is performed in the calibration of the sensor 100, there is a case where the authentication server 200 cannot properly authenticate the space 20. Therefore, the acceptance unit 114 is configured to accept an access key for performing calibration from a calibrator. The acceptance unit 114 may include a user interface and may be configured to accept an access key from a calibrator via the user interface. The permission unit 116 is configured to permit execution of calibration of the sensor 100 by the calibration unit 106 when the acceptance unit 114 accepts the access key.

The storage unit 108 may be configured to store associated information including at least one of a spatial volume of the space 20, a designed ventilation amount of the space 20, operator information for identifying an operator who uses the space 20, an installation time of the sensor 100, or an installation location of the sensor 100. The communication unit 112 may be configured to transmit the associated information to the authentication server 200 together with the statistical information.

The presentation unit 122 is configured to present presentation information that is according to the authentication result. The presentation unit 122 may be configured to present the presentation information by displaying the presentation information on a display unit or the like. The display unit configured to display the presentation information via the presentation unit 122 may be provided to the sensor 100 or may be provided to an outside terminal other than the sensor 100, such as a smart phone. The presentation unit 122 may be configured to present the presentation information on a display unit of a terminal such as a smart phone in which the sensor 100 is built. The presentation information may be generated by the generating unit 104. The storage unit 108 may be configured to associate and store in advance an authentication result and presentation information corresponding to a content of the authentication result. Another apparatus such as the authentication server 200 may be configured to generate presentation information according to the authentication result and to transmit the presentation information to the sensor 100. That is, another apparatus such as the authentication server 200 may include a generating unit configured to generate presentation information that is according to the authentication result, and a presentation unit configured to present the presentation information that is according to the authentication result. For example, an issuing unit 204 of the authentication server 200 may be configured to generate presentation information that is according to the authentication result. The issuing unit 204 may be configured to present the presentation information together with the authentication result.

The presentation information may include at least one of a content of the authentication result, an improvement proposal for improving an environment in the space 20 based on the authentication result, or an improvement proposal for improving an installed state of the sensor 100 based on the authentication result. The authentication result may be represented by an electronic authorization certificate issued from the authentication server 200 or the like, based on the authentication result by the authentication server 200. The content of the authentication result may represent whether the space 20 has been authenticated by the authentication server 200. The presentation unit 122 may be configured to determine that the space 20 has not been authenticated, when the electronic authorization certificate has not been received from the authentication server 200.

When the user confirms that the content of the authentication result has been presented, the presentation unit 122 may be configured to accept from the user that the authentication result has been received and confirmed, via the sensor 100 or a terminal other than the sensor 100, such as a smartphone, and the communication unit 112 may be configured to transmit a message representing that the authentication result has been received and confirmed to another apparatus such as the authentication server 200.

When the authentication result represents that authentication has not been made, or when the authentication result represents that an authentication condition is satisfied but the environment of the space 20 should be improved, the presentation unit 122 may be configured to present an improvement proposal. The improvement proposal may include confirmation information for confirming whether the installation location of the sensor 100 is not inappropriate. The confirmation information may include information for confirming whether the sensor 100 is not installed on a wall or next to a fire source, and whether the sensor 100 is not covered.

The improvement proposal may include an analysis report of the environment of the space 20. The improvement proposal may include a condition such as a time zone during which a state of the environment deteriorates. The improvement proposal may include a calibration proposal of the sensor 100. The calibration proposal may include a calibration method representing a calibration procedure that the user should perform. The calibration proposal may include information (telephone number or website) about a calibration operator who performs calibration of the sensor 100. The sensor 100 may be configured so that, when the user selects a phone number or website presented by the presentation unit 122, the calibration operator can make contact.

The improvement proposal may include a proposal for installing and operating an air conditioning apparatus such as a circulator in order to improve circulation of air or to eliminate stagnation of air. The improvement proposal may include a proposal for cleaning the ventilation equipment provided in the space 20. The improvement proposal may include information (telephone number or website) about a cleaning operator of the ventilation equipment. The improvement proposal may include a proposal for increase or repair of the ventilation equipment. The improvement proposal may include information (telephone number or website) about a ventilation equipment operator.

The improvement proposal may include a proposal for regularly opening a window installed in the space 20. The improvement proposal may include a proposal for urging reconsideration of a number of accommodation persons in the space 20. The improvement proposal may include information (telephone number or website) about a ventilation consulting operator.

The improvement proposal may include influence information when authentication is not obtained. The influence information may include information quantitatively representing an adverse influence on health, labor, or learning efficiency. The influence information may include information representing a degree of increase in an occurrence probability of an accident risk when the space 20 is an inside of a factory or an inside of a car. When the space 20 is a livestock production facility, the influence information may include information representing stress on livestock and an influence on productivity such as an amount of milk due to the stress on livestock.

When authentication by the authentication server 200 is not obtained over a predetermined number of times or over a predetermined period after the presentation unit 122 presents the improvement proposal, the informing unit 120 may be configured to inform a leader of the environment of the space 20, such as a local government, of a message for urging improvement request. In this way, a person in charge of the local government may visit the space 20, such as a store, give improvement guidance, or confirm consent to the effect that a penalty may be imposed.

The presentation unit 122 may be configured to present information representing an amount of ventilation per person based on data representing a congestion situation represented on a specific website or a congestion situation such as the number of visitors counted in the store.

The sensor 100 may be configured to cooperate with an environment control apparatus and to control the environment control apparatus according to the authentication result. The generating unit 104 may be configured to generate an environment control command for the environment control apparatus, based on the authentication result. The communication unit 112 may be configured to transmit the environment control command to the environment control apparatus. The generating unit 104 may be configured to generate an environment control command for controlling an operation of the ventilation equipment, based on the authentication result.

When the space 20 is an interior space of a vehicle, the generating unit 104 may be configured to generate interior space information relating to a state of the interior space of the vehicle, based on driving state information representing a driving state of the vehicle and the authentication result. The informing unit 120 may be configured to inform an outside of the interior space information. The driving state information may represent whether the vehicle is in a drivable state. The driving state information may be a stop command for stopping driving of a drive source of the vehicle. The driving state information may be a command representing off of an ignition-switch. The state of the interior space of the vehicle may represent whether a person is present in the interior space of the vehicle. The generating unit 104 may be configured to specify a carbon dioxide concentration in the interior space, based on the authentication result, and to generate interior space information representing that a person is present in the interior space of the vehicle when the carbon dioxide concentration represents a value with a high possibility of presence of a person. That is, the interior space information represents that a person is present in the interior space of the vehicle even though an ignition is off and the vehicle is not in a driving state. That is, the interior space information represents that there is a possibility that a person is left in the interior space of the vehicle. The informing unit 120 may be configured to inform an outside that there is a possibility that a person such as a child is left in the interior space of the vehicle such as a school bus or a pick-up/drop-off bus by informing the outside of the interior space information.

Figure 3:
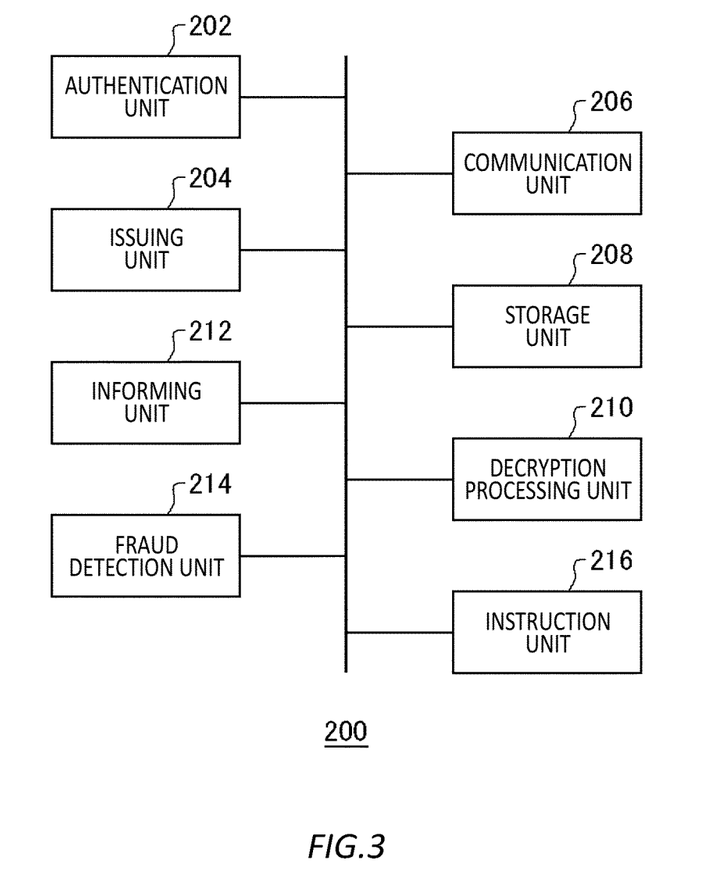
FIG. 3 is a diagram representing an example of a functional block of an authentication server.

FIG. 3 represents an example of a functional block of the authentication server 200. The authentication server 200 includes an authentication unit 202, an issuing unit 204, a communication unit 206, a storage unit 208, and a decryption processing unit 210. The authentication unit 202 is configured to authenticate the space 20, based on the statistical information of the environment information transmitted from the sensor 100. The authentication unit 202 may be configured to authenticate the space 20, based on a plurality of statistical information of the environment information transmitted from each of the plurality of sensors 100 provided in one space 20 to be authenticated. The communication unit 206 is configured to receive the statistical information of the environment information from the sensor 100. The communication unit 206 may be configured to receive the sensor identification information, installation information, calibration information, temperature/humidity information, and associated information from the sensor 100 together with the statistical information. The decryption processing unit 210 is configured to decrypt the encrypted information. The decryption processing unit 210 may be configured to decrypt the encrypted statistical information, sensor identification information, installation information, calibration information, temperature/humidity information, and associated information according to a predetermined decryption algorithm.

The authentication unit 202 may be configured to authenticate the space 20, based on at least one of the sensor identification information, the installation information, the calibration information, the temperature/humidity information, and the associated information, in addition to the statistical information. The authentication unit 202 may be configured to authenticate the space 20, based on the statistical information, the sensor identification information, the installation information, the calibration information, the temperature/humidity information, and the associated information. The storage unit 208 may be configured to store an authentication condition in association with the sensor identification information or associated information. The authentication unit 202 may be configured to authenticate the space 20 when at least one of the statistical information, the installation information, the calibration information, or the temperature/humidity information satisfies the authentication condition.

The authentication unit 202 is configured to refer to the installation information and to determine whether the sensor 100 is installed at a predetermined position. The authentication unit 202 is configured to refer to the calibration information and to determine whether the calibration of the sensor 100 has been performed in a predetermined period by an authorized calibrator based on a predetermined calibration method. The authentication unit 202 is configured to refer to the temperature/humidity information and to determine whether instrumentation of the environment information by the sensor 100 has been performed under an environment of temperature and humidity within predetermined temperature and humidity ranges. The authentication unit 202 is configured to authenticate the space 20 when the authentication condition of each piece of information is satisfied and the statistical information satisfies the authentication condition.

When the instrumentation unit 102 instruments the gas information representing the gas concentration in the space 20, as the environment information, the authentication unit 202 may be configured to authenticate the space 20 when an average value of the gas concentration in a predetermined period is equal to or less than a first threshold and the number of days for which the gas concentration in the predetermined period exceeds a second threshold is equal to or less than a reference number of days. Even when the average value of the gas concentration in the predetermined period is equal to or less than the first threshold, if the number of days for which the gas concentration exceeds the second threshold in the predetermined period exceeds the reference number of days, the authentication unit 202 may be configured not to authenticate the space 20.

The authentication unit 202 may be configured to authenticate the space when the gas concentration in a predetermined time zone in which a living body such as a human is absent is equal to or less than a threshold. The authentication unit 202 may be configured not to authenticate the space when the gas concentration in the predetermined time zone in which the living body is absent exceeds the threshold. When the space 20 is a plant factory, a transportation container or the like, the authentication unit 202 may be configured to authenticate the space if the gas concentration such as carbon dioxide is higher than a prescribed value or within a prescribed value range.

The issuing unit 204 is configured to issue an electronic authorization certificate for the space 20 when the authentication of the space 20 by the authentication unit 202 is successful. The electronic authorization certificate is an electronic document imparted with an electronic signature of an authorization authority and representing that the space 20 has been authenticated. The communication unit 206 is configured to transmit the electronic authorization certificate to a predetermined destination such as the administrator of the space 20. The issuing unit 204 may be configured to associate the electronic authorization certificate with the installer information and the apparatus ID and register them in a database accessible by a third party, via the communication unit 206. Thereby, a third party can easily check whether the space 20 has been authenticated, i.e., whether the space 20 is a safe place that satisfies the predetermined criterion by accessing the database using a search system or the like. For example, the third party may confirm whether the space 20 has been authenticated by accessing a map application, a search service, or a website of a public institution. Information about the space 20 that has not been authenticated may not be displayed on the website. The authentication unit 202 may be configured to authenticate the space 20 based on a plurality of predetermined step-by-step criteria. For example, the authentication unit 202 may be configured to authenticate the space 20 with three authentication levels of good, superior, and excellent. In this case, the authentication level of the space 20 may also be registered in the database so that the third party can also check the authentication level of the space 20 when accessing the website. Further, using the electronic authorization certificate, it may be displayed that a business operation of the space 20 is authenticated or the space 20 is authenticated, or the registration of a Web service may be permitted.

The authentication server 200 may further include an informing unit 212. When the space 20 has not been authenticated by the authentication unit 202, the informing unit 212 is configured to inform an outside of a message relating to the fact that the space 20 is not authenticated. The message may represent at least one of intent to urge inspection of the space 20, the fact that authentication of the space 20 has not been successful, or intent to urge repair or replacement of the sensor 100. A message representing intent to urge inspection of the space 20 may be informed to an administrator of an institution such as a government office having jurisdiction over authentication of the space 20 by an e-mail or the like. A message representing that the authentication of the space 20 has not been successful may be informed to the administrator of the space 20 by an e-mail or the like. By receiving the message, the administrator may consider improvement measures for successful authentication of the space 20. A message representing intent to urge calibration, repair, or replacement of the sensor 100 may be informed to an operator who performs correction or replacement of the sensor 100 by an e-mail or the like. When the space 20 has not been authenticated by the authentication unit 202, the authentication server 200 may be configured to automatically request repair or replacement of the sensor 100 from a predetermined operator who performs repair or replacement of the sensor 100 by using a smart contract or the like. When the space 20 has not been authenticated by the authentication unit 202, the informing unit 212 may be configured to inform the administrator of the space 20 of a message proposing dispatch of an advisor who guides improvement of the state of the space 20. The informing unit 212 may be configured to inform an administrator of the sensor 100 of a message representing that a calibration time of the sensor 100 is approaching at a stage before a predetermined period from the calibration time of the sensor 100. The authentication server 200 may be configured to automatically request calibration of the sensor 100 from a calibration operator who performs calibration by using a smart contract or the like at a stage before a predetermined period from the calibration time of the sensor 100.

The authentication server 200 may further include a fraud detection unit 214. The fraud detection unit 214 is configured to compare the statistical information from the sensor 100 and predetermined statistical information, thereby detecting that a fraud action is being performed on the sensor 100. The predetermined statistical information may be statistical information that is generated by the generating unit 104 in a state in which no fraud is performed on the sensor 100. When the statistical information is a histogram of instrumentation values instrumented by the sensor 100, the fraud detection unit 214 may be configured to compare the histogram from the sensor 100 and a reference histogram, thereby detecting whether a fraud action is being performed on the sensor 100. The fraud detection unit 214 may be configured to detect that a fraud action is being performed on the sensor 100 when a degree of similarity between the histograms is equal to or less than a threshold. The predetermined statistical information may be statistical information that is generated by the generating unit 104 in a state in which a fraud action has been performed on the sensor 100. In this case, for example, the fraud detection unit 214 may be configured to detect that a fraud action is being performed on the sensor 100 when the degree of similarity between histograms is equal to or greater than the threshold. When the fraud detection unit 214 detects that a fraud action is being performed on the sensor 100, the fraud detection unit may be configured to associate information, which represents that a fraud action has been performed on the sensor 100, and the installer information and apparatus ID and register them in a database accessible by an authenticator or a third party, via the communication unit 206. Thereby, an authenticator or a third party can easily check that a fraud action has been performed on the sensor 100 installed in the space 20 by accessing the database using a search system or the like.

Specifically, the fraud detection unit 214 is configured to take a numerical value of the environment information as x (for example, a numerical value of a carbon dioxide concentration), a histogram (for example, a time frequency distribution with respect to the numerical value x ppm of the carbon dioxide concentration, and a sum of frequencies for all x is 1) of a target with respect to the numerical value x of the environment information as P(x), and a histogram of a model for comparison as Q(x), and to derive a Kullback-Leibler information amount D defined by the following equation (2) or equation (3) as a degree of similarity. Then, the fraud detection unit 214 may be configured to detect that a fraud action is being performed on the sensor 100 when the degree of similarity is equal to or greater than a threshold. The histogram Q(x), which serves as a model for comparison, may be appropriately set as a standard model according to attribute information such as a use, the number of users, a used time and a type of a store of the space 20, a facility in the space 20, an operating status of the facility, an introduction time of the facility, an age and a completion time of a construction, and a conformity standard of a building, or may be or statistically prepared from a group of histograms collected according to the attribute information. Note that a calculation for authentication by the authentication unit 202 and a calculation for fraud detection by the fraud detection unit 214 may be performed together.

(Expression 2)

$$D(P, Q) = \sum_i P(i) \log \frac{P(i)}{Q(i)} \text{ or,} \quad (2)$$

(Expression 3)

$$D(Q, P) = \sum_i Q(i) \log \frac{Q(i)}{P(i)} \quad (3)$$

The fraud detection unit 214 may be configured to detect that a fraud action is being performed, based on other information such as information about a degree of congestion of persons based on the GPS of the portable terminal carried by the user, when the other information does not satisfy a predetermined condition.

The authentication server 200 may further include an instruction unit 216. When the space 20 has not been authenticated by the authentication unit 202, the instruction unit 216 is configured to instruct the sensor 100 to set an interval for transmitting the statistical information from the sensor 100 to an interval shorter than a current interval, via the communication unit 206. The sensor 100 is configured to change the setting of an interval for transmitting the statistical information to the authentication server 200 to an interval shorter than the current interval, in response to the instruction from the instruction unit 216. When the space 20 is not authenticated, there is a possibility that an abnormality has occurred in the environment of the space 20. By shortening the interval at which the sensor 100 transmits the statistical information, it is possible to determine at an early stage whether the abnormality is a temporary phenomenon or a continuous phenomenon.

Figure 4:
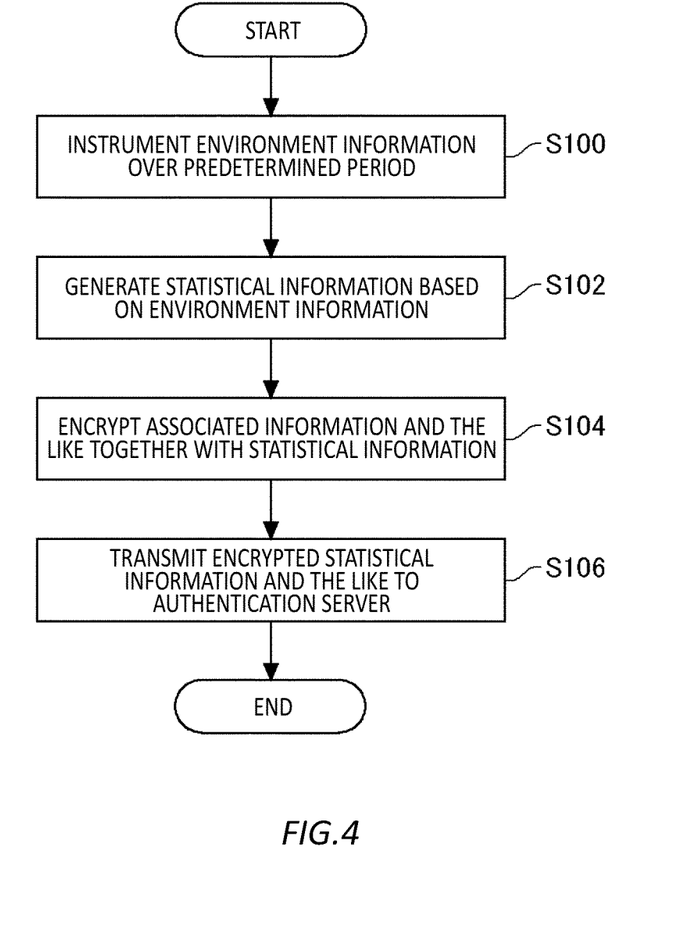
FIG. 4 is a flowchart representing an example of a transmission procedure of statistical information of the sensor.

FIG. 4 is a flowchart representing an example of a transmission procedure of the statistical information of the sensor 100.

The instrumentation unit 102 instruments the environment information such as a gas concentration to be instrumented in the space 20 at predetermined intervals (for example, once every 60 seconds) over a predetermined period (for example, one month) (S100). The instrumentation unit 102 may store the environment information in the storage unit 208. The generating unit 104 generates the statistical information, based on the environment information instrumented in the predetermined period and stored in the storage unit 108 (S102). The generating unit 104 may delete the environment information stored in the storage unit 108 when generation of the statistical information is completed. The encryption processing unit 110 acquires the sensor identification information, the installation information, the calibration information, the temperature/humidity information, and the associated information from the storage unit 108, and encrypts the acquired information together with the statistical information (S104). The communication unit 112 transmits the encrypted statistical information and the like to the authentication server 200 (S106).

Figure 5:
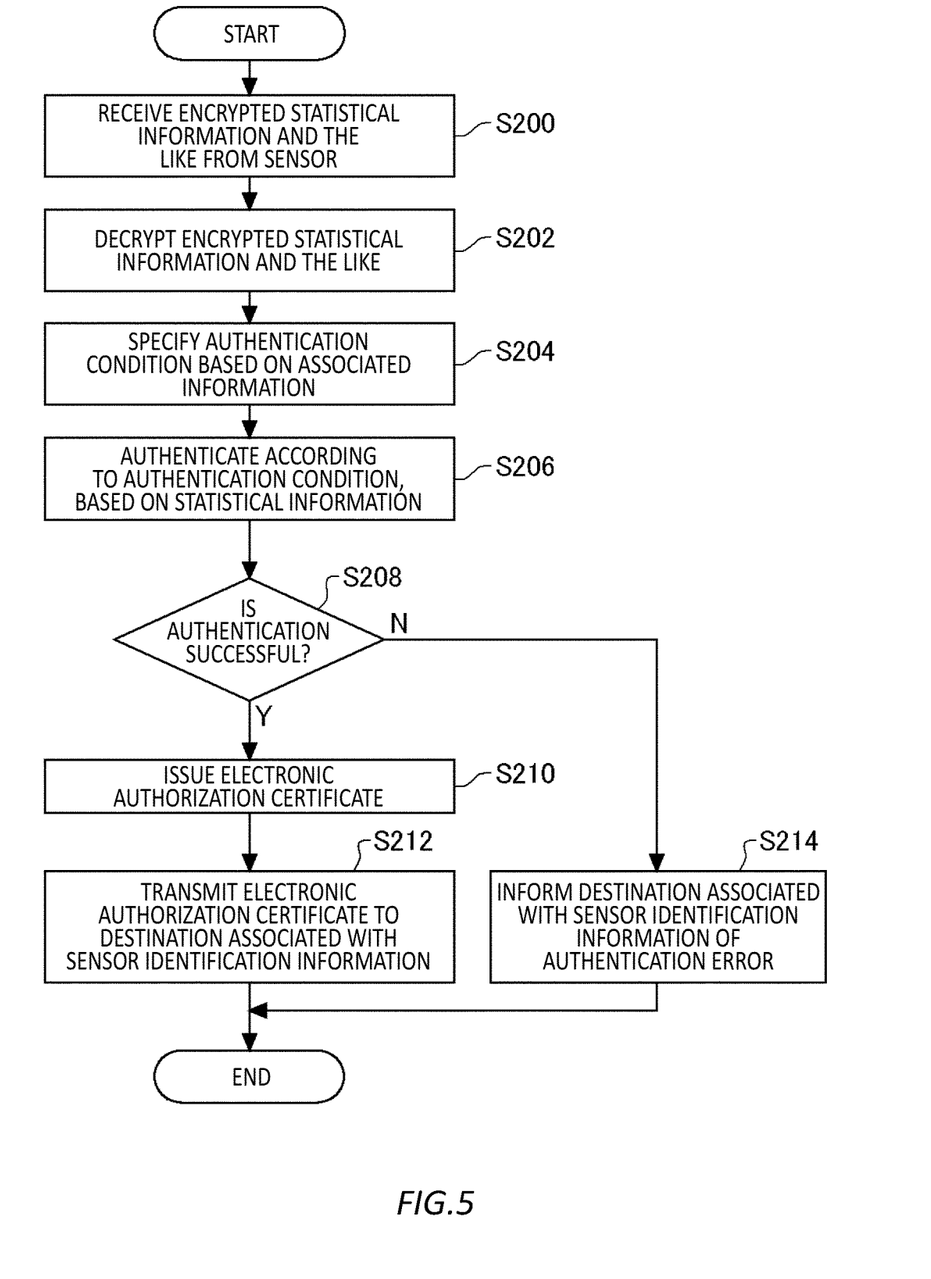
FIG. 5 is a flowchart representing an example of an authentication processing procedure of a space of the authentication server.

FIG. 5 is a flowchart representing an example of an authentication processing procedure of the space 20 of the authentication server 200.

The communication unit 206 receives the encrypted statistical information and the like from the sensor 100 (S200). The decryption processing unit 210 decrypts the encrypted statistical information and the like (S202). The authentication unit 202 refers to the authentication conditions stored in the storage unit 208 and specifies an authentication condition associated with the space 20, based on the decrypted associated information (S204).

The authentication unit 202 performs authentication according to the authentication condition, based on the statistical information (S206). The authentication unit 202 determines whether authentication has been successful (S208). When the authentication has been successful, the issuing unit 204 issues an electronic authorization certificate representing that the space 20 has been authenticated (S210). The communication unit 206 transmits the electronic authorization certificate to a destination associated with the sensor identification information (S212).

When the authentication has not been successful, the authentication unit 202 informs the destination associated with the sensor identification information of an authentication error via the communication unit 206 (S214).

As described above, according to the present embodiment, the authenticator does not need to go to the space 20 to be authenticated for each authentication, and therefore, the authentication procedure of the space 20 can be simplified.

Figure 6:
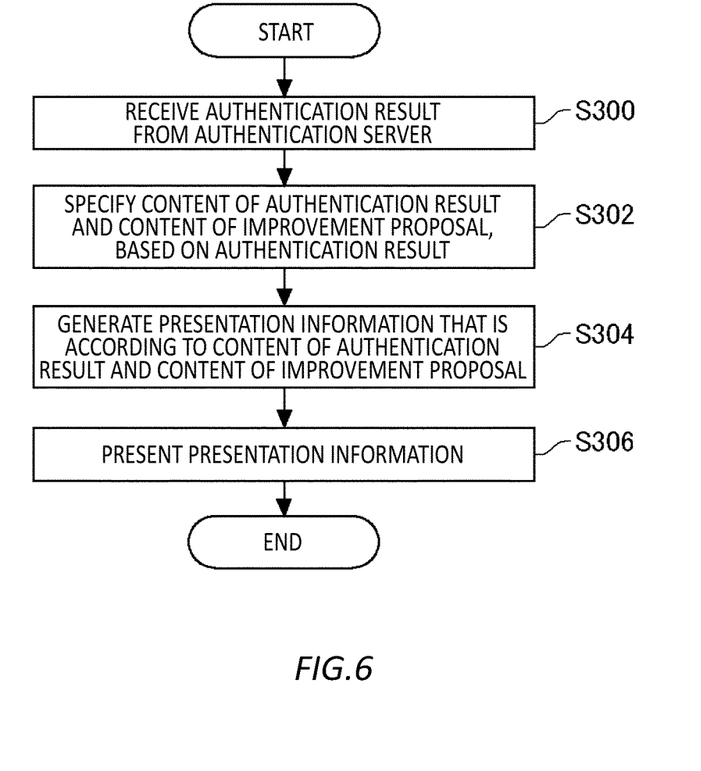
FIG. 6 is a flowchart representing an example of a presentation processing procedure of presentation information corresponding to an authentication result.

FIG. 6 is a flowchart representing an example of a processing procedure in which the sensor 100 presents presentation information according to an authentication result.

The communication unit 112 receives an authentication result from the authentication server 200 (S300). The communication unit 112 may receive the electronic authorization certificate as the authentication result. When the authentication server 200 has not authenticated the space 20, the communication unit 112 may receive an authentication result, which represents that the space has not been authenticated, from the authentication server 200.

Based on the authentication result, the generating unit 104 may specify a content of the authentication result and a content of the improvement proposal (S302). The generating unit 104 may specify the content of the authentication result from information representing whether the authentication has been successful, which is represented in the authentication result. The generating unit 104 may specify the content of the improvement proposal from the improvement information transmitted from the authentication server 200 together with the authentication result. The generating unit 104 may specify the content of the improvement proposal corresponding to the content of the authentication result associated with the authentication result by referring to the storage unit 108.

The generating unit 104 generates presentation information according to the specified content of the authentication result and the specified content of the improvement proposal (S304). The presentation unit 122 presents the presentation information by displaying the presentation information on the sensor 100 or a display unit of an apparatus other than the sensor 100 (S306).

Through the above processing, the sensor 100 can present the content of the authentication result or the improvement proposal to the user by using the authentication result made by the authentication server 200 based on the statistical information.

Figure 7:
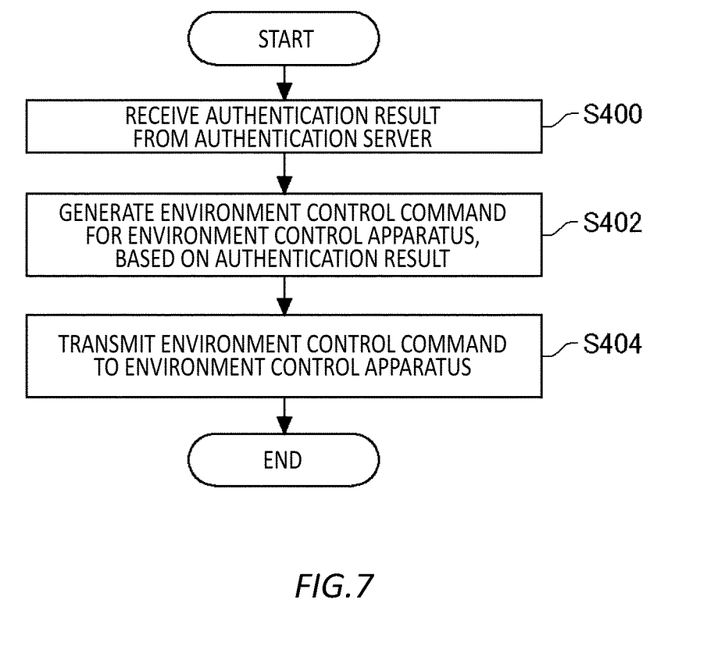
FIG. 7 is a flowchart representing an example of a generation procedure of an environment control command corresponding to an authentication result.

FIG. 7 is a flowchart representing an example of a procedure in which the sensor 100 generates an environment control command according to an authentication result.

The communication unit 112 receives an authentication result from the authentication server 200 (S400). The generating unit 104 generates an environment control command for the environment control apparatus, based on the authentication result (S402). When the authentication result represents that the carbon dioxide concentration is equal to or higher than the reference value in the space where a person is present, for example, the generating unit 104 may generate an environment control command to increase an amount of ventilation of the ventilation equipment. When the authentication result represents that the carbon dioxide concentration is equal to or less than the reference value in the plant factory, for example, the generating unit 104 may generate an environment control command to increase a supply amount of carbon dioxide to a supply apparatus configured to supply carbon dioxide. The communication unit 112 transmits the generated environment control command to the environment control apparatus (S404).

Through the above processing, the sensor 100 can control the environment control apparatus according to the correct authentication result authenticated by the authentication server 200 where no fraud action has been performed.

Figure 8:
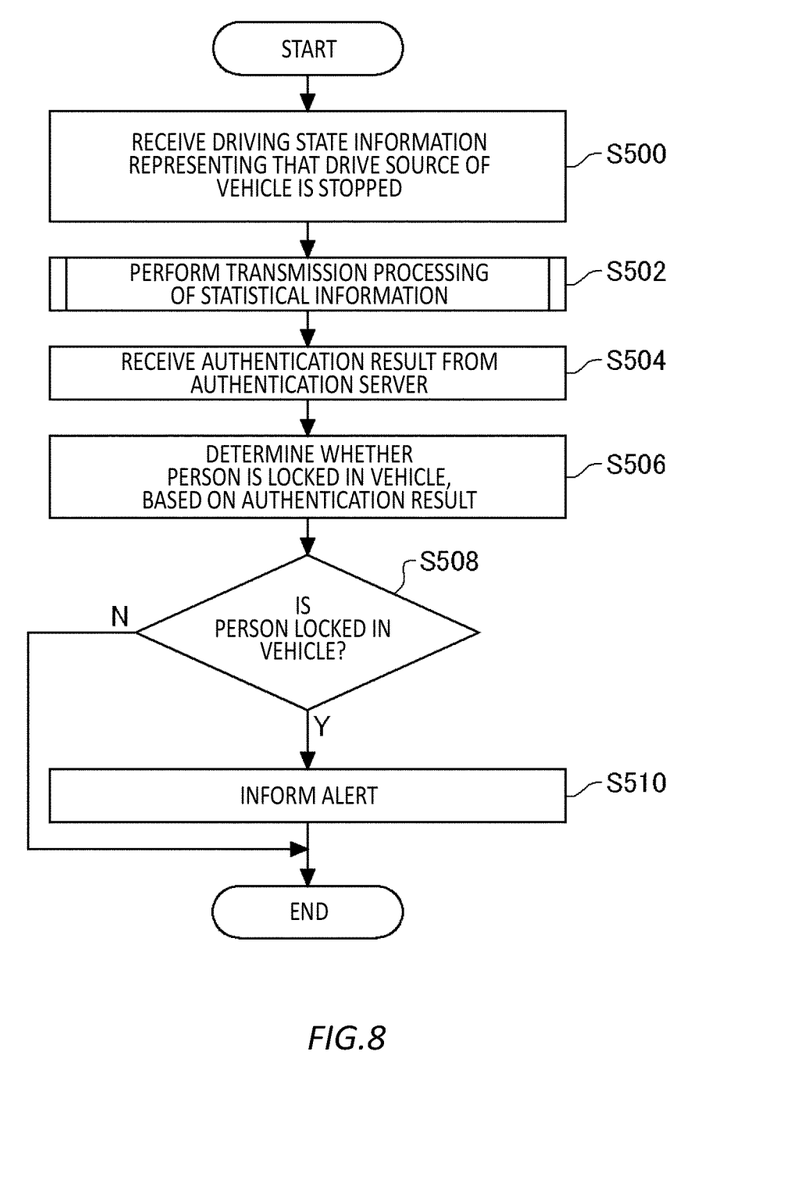
FIG. 8 is a flowchart representing an example of an in-vehicle locked situation detection processing procedure corresponding to an authentication result.

FIG. 8 is a flowchart representing an example of an in-vehicle locked situation detection processing procedure corresponding to an authentication result.

The communication unit 112 receives the driving state information representing that a drive source such as an engine or a drive motor of a vehicle is stopped from an ECU of the vehicle (S500). The communication unit 112 may receive an off signal of an ignition switch from the ECU. When the sensor 100 receives the driving state information representing that the drive source is stopped, the sensor collects the environment information and generates the statistical information according to the flowchart represented in FIG. 4, and transmits the statistical information to the authentication server 200 (S502).

Subsequently, the communication unit 112 receives an authentication result based on the statistical information from the authentication server 200 (S504). Based on the authentication result, the generating unit 104 specifies the carbon dioxide concentration in the interior space, and determines whether a person is in an in-vehicle locked situation, depending on whether the carbon dioxide concentration represents a value with a high possibility of presence of a person (S506). The generating unit 104 generates interior space information representing that a person is present in the interior space of the vehicle, when the carbon dioxide concentration represents a value with a high possibility of presence of a person ("Y" in S508). Then, the informing unit 120 informs a predetermined terminal, an informing apparatus and the like of the interior space information representing that a person is present in the interior space of the vehicle, as an alert (S510). On the other hand, the generating unit 104 ends the processing when the carbon dioxide concentration does not represent a value with a high possibility of presence of a person ("N" in S508).

Through the above processing, the sensor 100 can detect and inform that a person is locked in the vehicle, according to the correct authentication result authenticated by the authentication server 200 where no fraud action has been performed.

While the present invention has been described with the embodiments, the technical scope of the present invention is not limited to the above-described embodiments. It is apparent to persons skilled in the art that various alterations and improvements can be added to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: authentication system
20: space
50: network
100: sensor
102: instrumentation unit
104: generating unit
106: calibration unit
108: storage unit
110: encryption processing unit
112: communication unit
114: acceptance unit
116: permission unit
118: detection unit
120: informing unit
122: presentation unit
200: authentication server 202: authentication unit
204: issuing unit
206: communication unit
208: storage unit
210: decryption processing unit
212: informing unit
214: fraud detection unit
216: instruction unit.

What is claimed is:

1. An authentication system comprising:
a sensor including: an instrumentation unit configured to instrument environment information about an environment in a space to be authenticated; a generating unit configured to generate statistical information about the environment of the space based on the environment information; and a communication unit configured to transmit the statistical information to an authentication server configured to authenticate the space based on the statistical information; and
the authentication server, wherein
the authentication server includes
an authentication unit configured to authenticate the space based on the statistical information.

2. The authentication system according to claim 1, wherein
the environment information represents at least one of a gas concentration, a dust level, temperature, humidity, a noise, an illuminance, vibration, an electromagnetic wave, an X-ray dose, a radiation dose, or an ozone concentration to be instrumented in the space.

3. The authentication system according to claim 1, wherein
the statistical information includes at least one of an average value, a maximum value, a minimum value, variance, a moment, or a histogram of instrumentation values, which are the environment information.

4. The authentication system according to claim 1, wherein
the sensor further includes a storage unit configured to associate and store the statistical information and sensor identification information for uniquely identifying the sensor, and
the communication unit is configured to transmit the sensor identification information to the authentication server together with the statistical information.

5. The authentication system according to claim 4, wherein
the sensor further includes a calibration unit configured to perform calibration of the sensor,
the storage unit is configured to store calibration information including at least one of a calibration time at which calibration should be performed by the calibration unit, a date and time of calibration performed by the calibration unit, a calibration method, or calibrator information, and
the communication unit is configured to transmit the calibration information to the authentication server together with the statistical information.

6. The authentication system according to claim 5, wherein
the sensor further includes an informing unit configured to inform a message representing the calibration time.

7. The authentication system according to claim 4, wherein
the instrumentation unit is configured to instrument gas information representing a concentration of gas in the space, as the environment information.

8. The authentication system according to claim 7, wherein
the instrumentation unit is configured to instrument carbon dioxide information representing a concentration of carbon dioxide in the space, as the gas information.

9. The authentication system according to claim 8, wherein
the instrumentation unit is configured to further instrument temperature/humidity information representing temperature and humidity in the space, as the environment information.

10. The authentication system according to claim 9, wherein
the storage unit is configured to store associated information including at least one of a spatial volume of the space, a designed ventilation amount of the space, operator information for identifying an operator who uses the space, an installation time of the sensor, or an installation location of the sensor, and
the communication unit is configured to transmit the associated information to the authentication server together with the statistical information.

11. The authentication system according to claim 1, wherein
the instrumentation unit is configured to instrument gas information representing a concentration of gas in the space, as the environment information, and
the authentication unit is configured not to authenticate the space if a number of at least one day for which the concentration exceeds a second threshold in a predetermined period exceeds a reference number of days, even when an average value of the concentration in the predetermined period is equal to or less than a first threshold.

12. The authentication system according to claim 1, wherein
the instrumentation unit is configured to instrument gas information representing a concentration of gas in the space, as the environment information, and
the authentication unit is configured not to authenticate the space when the concentration exceeds a threshold in a predetermined time zone in which a living body is absent.

13. The authentication system according to claim 1, comprising a plurality of sensors including the sensor, wherein
the authentication server is configured to authenticate the space based on the statistical information from the plurality of sensors.

14. The authentication system according to claim 1, wherein
the authentication server further includes
an informing unit configured to, when the space is not authenticated by the authentication unit, inform an outside of a message relating to a fact that the space is not authenticated.

15. The authentication system according to claim 14, wherein
the message represents at least one of intent to urge inspection of the space, a fact that authentication of the space has not been successful, or intent to urge repair or replacement of the sensor.

16. The authentication system according to claim 1, wherein
the authentication server further includes
a fraud detection unit configured to detect that a fraud action has been performed on the sensor by comparing the statistical information and predetermined statistical information.

17. The authentication system according to claim 1, wherein
the authentication server is configured to associate installer information about an installer who has installed the sensor and sensor identification information for uniquely identifying the sensor and register them in a storage unit accessible by the authentication server.

18. An authentication server comprising
an authentication unit configured to authenticate a space, based on statistical information transmitted from a sensor including an instrumentation unit configured to instrument environment information about an environment in the space to be authenticated, a generating unit configured to generate the statistical information about the environment of the space based on the environment information, and a communication unit configured to transmit the statistical information.

19. The authentication system according to claim 1, wherein
the authentication server further includes an issuing unit configured to issue an electronic authorization certificate for the space when the space is authenticated by the authentication unit.

20. A sensor comprising:
an instrumentation unit configured to instrument environment information about an environment in a space to be authenticated;
a generating unit configured to generate statistical information about the environment of the space based on the environment information; and
a communication unit configured to transmit the statistical information to an authentication server configured to authenticate the space based on the statistical information.

* * * * *